Patented Mar. 26, 1935

1,996,011

UNITED STATES PATENT OFFICE 1,996,011

METHOD OF REACTING MERCAPTOTHIAZOLES WITH PRIMARY AMINES AND FORMALDEHYDE

William Earl Messer, New Haven County, Conn., assignor, by mesne assignments, to United States Rubber Company, New York, N. Y., a corporation of New Jersey No Drawing. Application September 16, 1932, Serial No. 633,456

22 Claims. (Cl. 260—44)

This invention relates to a method of preparing reaction products of mercaptothiazoles with primary aromatic amines and formaldehyde.

An object of this invention is to produce these materials from a mercaptothiazole, a primary aromatic amine and formaldehyde, without resorting to the use of volatile solvents as the reaction medium, or expensive mixer processes wherein the heat or energy requirements are high. Other objects will be apparent from the description.

For the purpose of illustration, solely, and irrespective of theory, it is assumed that these reaction products have the general formula $$R_1-S-CH_2-NH-R$$ 

wherein R is a substituted or unsubstituted aryl group and $R_1$ is a thiazyl group, and result from reacting a mercaptothiazole with a methylene-primary aromatic amine (methylene base) which in turn is the reaction product of formaldehyde and a primary aromatic amine. Under certain conditions, as disclosed herein, the mercaptothiazole, the formaldehyde and the primary aromatic amine may each be brought together in aqueous solution wherein the reaction proceeds to produce products which may have the above formula. It is believed that both the original thiazyl group and the mercaptan sulphur are preserved in the final compound.

Broadly the invention comprises mixing an aqueous solution containing dissolved therein a mercaptothiazole and formaldehyde with a water soluble form of a primary aromatic amine, and more specifically, comprises (1) making an aqueous solution of a mercaptothiazole by dissolving it in water in the form of a water-scluble fixed alkali or organic base salt, incapable of reacting with formaldehyde and more strongly basic than the methylene base to be reacted, or dissolving it in water containing aforesaid alkali or organic base,—(2) adding to the aqueoeus solution formaldehyde, preferably in the form of an aqueous solution, with agitation and cooling,— and then (3) slowly mixing with the cooled solution, an aqueous solution of a primary aromatic amine which has been acidified by addition of an acid. The acid and amine would form the water soluble amine salt of the acid in solution, the resulting solution being of acidic character. The primary amine-acid solution may be added to the cooled alkaline solution of the mercaptothiazole and formaldehyde or vice versa. The primary materials, e. g. the mercaptothiazole, formaldehyde, and primary aromatic amine, as well as the secondary materials, e. g. the acid and fixed alkali, or even organic base, are preferably used in equimolar quantities.

The following example is given to illustrate the invention and is not to be construed as limiting thereof:

*Example 1.*—83 g. of mercaptobenzothiazole were dissolved in 20 g. of pure sodium hydroxide and 1000 g. water. To this solution were added approximately 41 g. of 37% formaldehyde or the equivalent of formaldehyde (100%). This alkaline solution was agitated and kept cold while a solution of 46 g. aniline and 53 g. concentrated hydrochloric acid in 600 g. water was slowly added. The charge was cooled under agitation for a period of from 1 to 3 hours. The crystalline product was filtered off, washed, dried in any suitable manner so that the temperature did not reach the melting point of the reaction product and then ground. The light colored crystalline reaction product was thus obtained in nearly quantitative yields, melting at about 113° C.

Instead of sodium hydroxide, potassium hydroxide or other fixed alkalis may be used to solubilize the mercaptothiazole in aqueous solution, including carbonates and bicarbonates of sodium or potassium, using heat when necessary, as well as organic bases which together with the thiazole form salts incapable of reacting with the formaldehyde and which are more strongly basic than the methylene base to be reacted. Also instead of hydrochloric acid, which is preferred, other acids, for example nitric, sulphuric, sulfurous, acetic, etc. may be used to solubilize the amine and form soluble salts therewith.

The benzothiazyl group is shown by the following structure in which the atoms are numbered for the purposes of the invention as indicated:

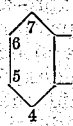

While mercaptobenzothiazole, aniline, and formaldehyde have been given as illustrative, other materials may be similarly used for example, as mercaptothiazoles: 5-nitro mercaptobenzothiazole, 5 chlor-mercaptobenzothiazole, toluthiazole (sometimes referred to as tolyl thiazole); as amines: o- or p-toluidine, alpha or beta naphthylamine, p-xylidine, o-chlor aniline, p-chlor aniline, p-anisidine, 2-5 dichlor aniline.

The products may be used as accelerators for the vulcanization of rubber and in this respect the following reaction products are particularly useful: The reaction product of formaldehyde, 5-nitro mercaptobenzothiazole and aniline; formaldehyde, 5-chlor mercaptobenzothiazole and aniline; formaldehyde, mercaptobenzothiazole and o- or p-toluidine; formaldehyde, mercaptobenzothiazole and alpha or beta naphthylamine; formaldehyde, toluthiazole and aniline; formaldehyde, mercaptobenzothiazole and aniline; formaldehyde; mercaptobenzothiazole and p-xylidine; formaldehyde, mercaptobenzothiazole and o-chlor aniline; formaldehyde, mercaptobenzothiazole, and p-chlor aniline; formaldehyde, 5-nitro mercaptobenzothiazole, and o-toluidine; formaldehyde, 5-nitro mercaptobenzothiazole, and beta naphthylamine; formaldehyde, mercaptobenzothiazole, and p-anisidine; mercaptobenzothiazole, formaldehyde and 2-5 dichloraniline.

It is to be understood that in the claims the terms "basic" and "alkaline" refer only to a condition arising from the use of fixed alkalis and aforementioned organic bases.

It will be apparent to those skilled in the art that certain modifications in the amounts of materials specified in the preferred example may be made without departing from the scope of the invention, as may be required in the use of impure or commercial grades in place of chemically pure materials. For example, an excess of fixed alkali may be used, sufficient to neutralize any formic acid present in or arising from commercial grades of formaldehyde or formed in situ during the reaction. Such modifications would be dependent on the comparative purity of the primary and secondary materials selected which, in turn, should preferably be present in equimolar quantities.

Having thus described my invention, what I claim and desire to protect by Letters Patent is:

1. A process of making the reaction product of formaldehyde, a 2-mercapto-aryl-thiazole of the benzene series, and a primary aromatic amine of the benzene and naphthalene series, which comprises mixing an acid salt of said primary aromatic amine with a cooled aqueous solution containing formaldehyde and an alkali-metal salt of said mercaptoaryl thiazole.

2. A process of making the reaction product of formaldehyde, a 2-mercapto-aryl-thiazole of the benzene series, and a primary aromatic amine of the benzene and naphthalene series, which comprises mixing at a relatively low temperature an aqueous solution of an acid salt of said primary aromatic amine with a cooled aqueous solution containing formaldehyde and an alkali-metal salt of said mercaptoaryl thiazole.

3. A process of making the reaction product of formaldehyde, a 2-mercapto-aryl-thiazole of the benzene series, and a primary aromatic amine of the benzene and naphthalene series which comprises mixing formaldehyde with an aqueous alkaline solution of said mercaptoarylthiazole, cooling the solution and mixing therewith an aqueous solution of an acid salt of said primary aromatic amine, and recovering the precipitated crystalline reaction product.

4. A process of making the reaction product of formaldehyde, a 2-mercapto-aryl-thiazole of the benzene series, and a primary aromatic amine of the benzene and naphthalene series, which comprises mixing formaldehyde with an aqueous alkaline solution of said mercaptoarylthiazole, cooling the solution and mixing therewith an aqueous solution of an acid salt of aniline, and recovering the precipitated crystalline reaction product.

5. A process of making the reaction product of formaldehyde, a 2-mercapto-aryl-thiazole of the benzene series, and a primary aromatic amine of the benzene and naphthalene series, which comprises preparing an aqueous solution of formaldehyde and an alkali-metal salt of 2-mercaptobenzothiazole, cooling the solution and mixing therewith an aqueous solution of hydrochloric acid and aniline, and recovering the precipitated crystalline reaction product.

6. A process of making the reaction product of formaldehyde, a 2-mercapto-aryl-thiazole of the benzene series, and a primary aromatic amine of the benzene and naphthalene series, which comprises mixing formaldehyde with an aqueous alkaline solution of said mercaptoarylthiazole, cooling the solution and mixing therewith an aqueous solution of an acid salt of a toluidine, and recovering the precipitated crystalline reaction product.

7. A process of making the reaction product of formaldehyde, a 2-mercapto-aryl-thiazole of the benzene series, and a primary aromatic amine of the benzene and naphthalene series, which comprises preparing an aqueous solution of formaldehyde and an alkali-metal salt of 2-mercaptobenzothiazole, cooling the solution and mixing therewith an aqueous solution of hydrochloric acid and ortho toluidine, and recovering the precipitated crystalline reaction product.

8. A process of making the reaction product of formaldehyde, a 2-mercapto-aryl-thiazole of the benzene series, and a primary aromatic amine, of the benzene and naphthalene series, which comprises mixing formaldehyde with an aqueous alkaline solution of said mercaptoarylthiazole, cooling the solution and mixing therewith an aqueous solution of an acid salt of a halogen substituted aniline, and recovering the precipitated crystalline reaction product.

9. A process of making the reaction product of formaldehyde, a 2-mercapto-aryl-thiazole of the benzene series, and a primary aromatic amine, of the benzene and naphthalene series, which comprises preparing an aqueous solution of formaldehyde and an alkali-metal salt of 2-mercaptobenzothiazole, cooling the solution and mixing therewith an aqueous solution of hydrochloric acid and ortho chlor aniline, and recovering the precipitated crystalline reaction product.

10. A process of making a reaction product having the probable general formula

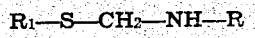

$R_1-S-CH_2-NH-R$ wherein R is an aryl group of the benzene and naphthalene series, and $R_1$ is a benzo-thiazyl group, which comprises mixing an aqueous solution containing formaldehyde and a water soluble salt of a 2-mercaptobenzothiazole with an aqueous solution of a primary aromatic amine salt of the benzene and naphthalene series.

11. A process of making a reaction product having the probable general formula

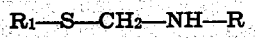

$R_1-S-CH_2-NH-R$ wherein R is an aryl group of the benzene and naphthalene series, and $R_1$ is a benzo-thiazyl group, which comprises mixing an aqueous solution containing formaldehyde and a fixed alkali salt of a 2-mercaptobenzothiazole with an aqueous solution of a primary aromatic amine salt of the benzene and napthalene series.

12. A process of making a reaction product having the probable general formula $$R_1\text{---}S\text{---}CH_2\text{---}NH\text{---}R,$$

wherein R is an aryl group of the benzene and naphthalene series, and $R_1$ is a benzo-thiazyl group, which comprises mixing an aqueous basic solution containing a 2-mercaptobenzothiazole and formaldehyde with an aqueous acidic solution of a primary aromatic amine salt of the benzene and naphthalene series.

13. A process of making a reaction product having the probable general formula $$R_1\text{---}S\text{---}CH_2\text{---}NH\text{---}R,$$

wherein R is an aryl group of the benzene and naphthalene series, and $R_1$ is a benzo-thiazyl group, which comprises mixing an acid salt of a primary aromatic amine chosen from benzene and naphthalene series with a cooled aqueous solution containing formaldehyde and an alkali-metal salt of a 2-mercaptobenzothiazole.

14. A process of making a reaction product having the probable general formula $$R_1\text{---}S\text{---}CH_2\text{---}NH\text{---}R,$$

wherein R is an aryl group of the benzene and naphthalene series, and $R_1$ is a benzo-thiazyl group, which comprises mixing at a relatively low temperature an aqueous solution of an acid salt of a primary aromatic amine chosen from the benzene and naphthalene series with a cooled aqueous solution containing formaldehyde and an alkali-metal salt of a 2-mercaptobenzothiazole.

15. A process of making a reaction product having the probable general formula $$R_1\text{---}S\text{---}CH_2\text{---}NH\text{---}R,$$

wherein R is an aryl group of the benzene and naphthalene series, and $R_1$ is a benzo-thiazyl group, which comprises mixing formaldehyde with an aqueous alkaline solution of a 2-mercaptoarylthiazole, cooling the solution and mixing therewith an aqueous solution of a mineral acid and a primary aromatic amine salt chosen from the benzene and naphthalene series, and recovering the precipitated crystalline reaction product.

16. A process of making a reaction product having the probable general formula $$R_1\text{---}S\text{---}CH_2\text{---}NH\text{---}R,$$

wherein R is an aryl group of the benzene and naphthalene series, and $R_1$ is a benzo-thiazyl group, which comprises mixing formaldehyde with an aqueous alkaline solution of a 2-mercaptobenzothiazole, cooling the solution and mixing therewith an aqueous solution of an acid salt of a primary aromatic amine chosen from the benzene and naphthalene series, and recovering the precipitated crystalline reaction product.

17. A process of making a reaction product having the probable general formula $$R_1\text{---}S\text{---}CH_2\text{---}NH\text{---}R$$

wherein R is an aryl group of the benzene and naphthalene series, and $R_1$ is a benzo-thiazyl group, which comprises mixing formaldehyde with an aqueous alkaline solution of 2-mercaptobenzothiazole, cooling the solution and mixing therewith an aqueous solution of an acid salt of aniline, and recovering the precipitated crystalline reaction product.

18. A process of making a reaction product having the probable general formula $$R_1\text{---}S\text{---}CH_2\text{---}NH\text{---}R$$

wherein R is an aryl group of the benzene and naphthalene series, and $R_1$ is a benzo-thiazyl group, which comprises preparing an aqueous solution of formaldehyde and an alkali-metal salt of 2-mercaptobenzothiazole, cooling the solution and mixing therewith an aqueous solution of hydrochloric acid and aniline, and recovering the precipitated crystalline reaction product.

19. A process of making a reaction product having the probable general formula $$R_1\text{---}S\text{---}CH_2\text{---}NH\text{---}R$$

wherein R is an aryl group of the benzene and naphthalene series, and $R_1$ is a benzo-thiazyl group, which comprises mixing formaldehyde with an aqueous alkaline solution of a 2-mercaptobenzothiazole, cooling the solution and mixing therewith an aqueous solution of an acid salt of a toluidine, and recovering the precipitated crystalline reaction product.

20. A process of making a reaction product having the probable general formula $$R_1\text{---}S\text{---}CH_2\text{---}NH\text{---}R$$

wherein R is an aryl group of the benzene and naphthalene series, and $R_1$ is a benzo-thiazyl group, which comprises preparing an aqueous solution of formaldehyde and an alkali-metal salt of 2-mercaptobenzothiazole, cooling the solution and mixing therewith an aqueous solution of hydrochloric acid and ortho toluidine, and recovering the precipitated crystalline reaction product.

21. A process of making a reaction product having the probable general formula $$R_1\text{---}S\text{---}CH_2\text{---}NH\text{---}R$$

wherein R is an aryl group of the benzene and naphthalene series, and $R_1$ is a benzo-thiazyl group, which comprises mixing formaldehyde with an aqueous alkaline solution of a 2-mercaptobenzothiazole, cooling the solution and mixing therewith an aqueous solution of an acid salt of a halogen substituted aniline, and recovering the precipitated crystalline reaction product.

22. A process of making a reaction product having the probable general formula $$R_1\text{---}S\text{---}CH_2\text{---}NH\text{---}R$$

wherein R is an aryl group of the benzene and naphthalene series, and $R_1$ is a benzo-thiazyl group, which comprises preparing an aqueous solution of formaldehyde and an alkali-metal salt of 2-mercaptobenzothiazole, cooling the solution and mixing therewith an aqueous solution of hydrochloric acid and ortho chlor aniline, and recovering the precipitated crystalline product.

WILLIAM EARL MESSER.